United States Patent Office 3,096,069
Patented July 2, 1963

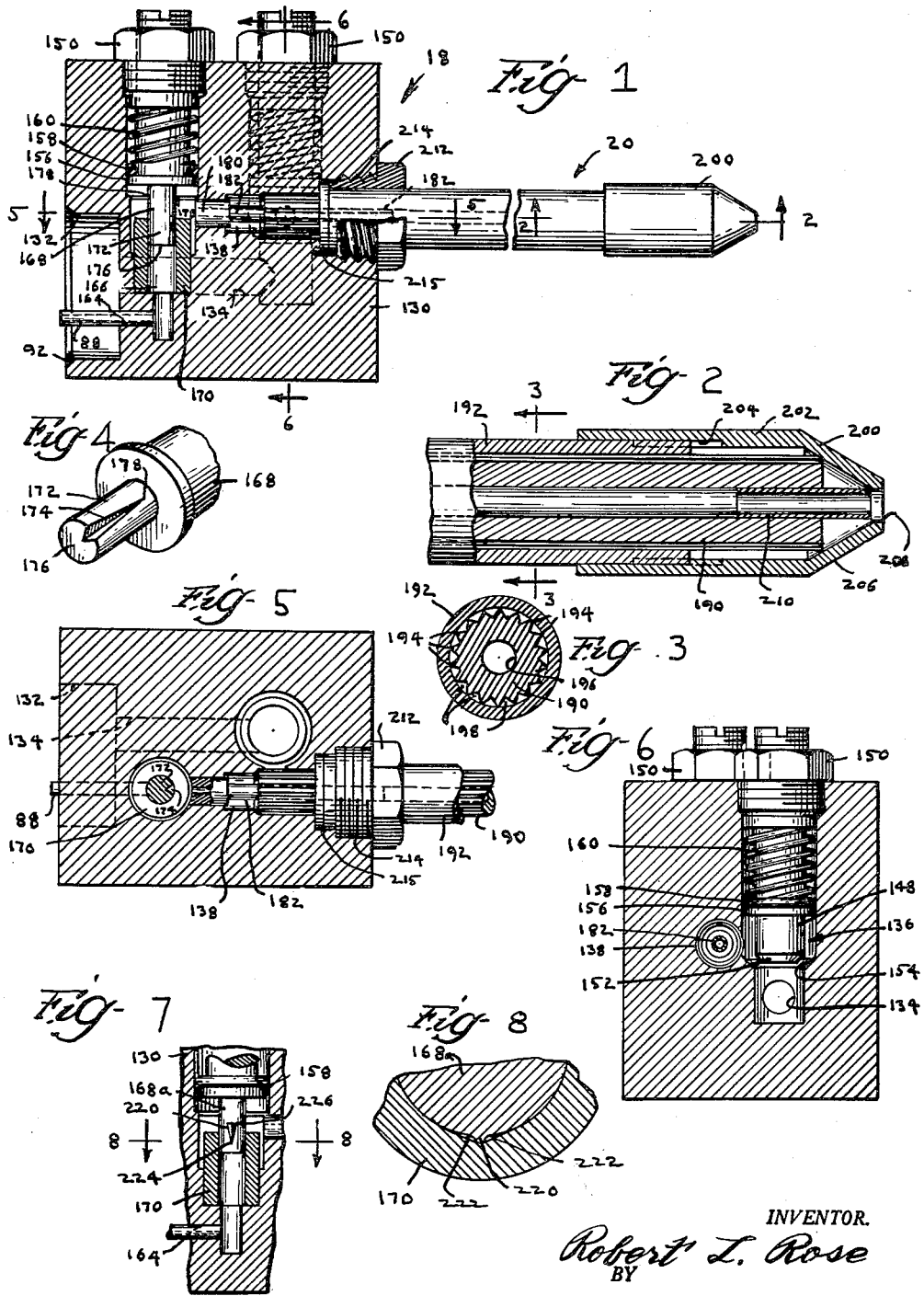

3,096,069
FLUID FLOW CONTROL VALVE
Robert L. Rose, 915 Augusta Blvd., Oak Park, Ill.
Filed May 8, 1957, Ser. No. 657,946
5 Claims. (Cl. 251—205)

My invention relates to a fluid flow control valve for providing a continuous low volume flow of fluid at relatively low pressures, and such valve is particularly adapted for use in connection with apparatus for providing a mist-type coolant for machine tools and the like, as distinguished from a liquid flow coolant.

It has always been thought necessary to employ large volumes of liquid flow in spray or mist-type coolant systems to obtain maximum performance. However, this large flow is one of the inherent weaknesses of conventional spray-type apparatus as the spray provided includes so much liquid that the action of the tool on the work cannot be observed. Moreover, the economics of large volume flow requires some sort of reclaiming and recirculating system which adds materially to the complexity and cost of this apparatus.

Contrary to the accepted view, I have found that spray or mist-type coolant apparatus should employ relatively low volume liquid flows, and that low volume liquid flows will not only increase the efficiency of the cooling operation but will also provide a surprising increase in tool life and production output, besides permitting a machine tool operator to readily observe the tool and work.

A principal object of my invention is to provide a fluid flow control valve for use in a mist-type coolant system for cooling machine tools and the like wherein exceedingly low pressure low volume fluid flows may be employed to provide a mist-like spray that not only exceeds cooling and lubrication requirements, but which also does not obstruct one's view of the work.

Another object of the invention is to provide a liquid flow control valve that will limit liquid flow to that on the order of a drop every fifteen seconds and yet provide a continuous flow to the point where the liquid is to be used.

Another object of the invention is to provide a novel form of low volume, low pressure fluid flow regulating valve adapted for use in connection with both liquids and gases.

Other objects, uses and advantages will be obvious or become apparent from a consideration of the following description and the drawing.

In the drawing:

FIGURE 1 is a cross-sectional view, partially in elevation, through a mist-type coolant system fluid flow regulating component arranged in accordance with the principles of my invention, shown connected to a nozzle component forming a part of the mist coolant system and illustrating my novel flow control valve;

FIGURE 2 is a cross-sectional view along line 2—2 of FIGURE 1;

FIGURE 3 is a diagrammatic cross-sectional view along line 3—3 of FIGURE 2;

FIGURE 4 is a diagrammatic perspective view of a portion of the liquid flow regulating valve forming a part of the metering component shown in FIGURE 1;

FIGURE 5 is a cross-sectional view along line 5—5 of FIGURE 1, partially in plan;

FIGURE 6 is a cross-sectional view along line 6—6 of FIGURE 1, partially in plan;

FIGURE 7 is a fragmental diagrammatic cross-sectional view illustrating a modified form of liquid flow regulating valve that may be employed in the flow regulating component shown in FIGURE 1; and FIGURE 8 is a fragmental cross-sectional view along line 8—8 of FIGURE 7.

The flow regulating component 18 as illustrated in FIGURES 1 through 8 forms a part of a mist coolant system for machine tools of the general type shown in my abandoned application Serial No. 543,484, filed October 28, 1955. In the illustrated embodiment, the flow regulating component comprises a body or block 130 formed with a recess 132 that is adapted to receive the end of a dual passage tubing component forming a part of the coolant apparatus. The recess 132 on one side thereof leads to a gas passageway 134 that in turn leads to a gas flow regulating chamber 136 which has communication with a gas outlet chamber 138. A stem 148 is screw threadedly mounted in an internally screw threaded nut 150 that is screw threadedly received in the end of chamber 136. The stem 148 is formed with a tapered surface 152 that cooperates with edges 154 of valve chamber 136 to stop all gas flow through the flow regulating component. The stem 148 includes a flange 156 adjacent to which an O-ring seal 158 is positioned. An appropriate helical spring 160 extending between the O-ring 158 and the nut 150 biases the O-ring against flange 156. O-ring seal 158 seals off the outer portion of the chamber 136.

A liquid passageway 164 extends from the other side of the recess 132 and in this particular arrangement an insert component 88 is mounted in this passage for cooperation with one of the passages of the above mentioned tubing component. Passageway 164 and insert 88 lead to a liquid flow regulating chamber 166 in which a stem 168 is received that is generally similar to stem 148 except as hereinafter described. Thus the stem 148 includes the flange 156, an O-ring seal 158, nut 150 and spring 160 that serve the same purposes as those described in connection with stem 148.

As best shown in FIGURES 1 and 5, a resilient cylindrical insert 170 in the form of a plastic sleeve is fixedly mounted in the chamber 166, and the end 172 of stem 168 is received within sleeve 170. Preferably, the end 172 of stem 168 and the internal diameter of sleeve 170 are proportioned so that end 172 is frictionally received within the sleeve 170, and thus the sleeve 170 will resiliently engage the cylindrical surface of end 172. The sleeve 170 should grip end 172 tightly enough to preclude all fluid flow between these two elements except as described below.

As diagrammatically illustrated in FIGURE 4, end 172 is formed with a tapering slot or groove 174 which has its greatest cross-sectional area at the stem end or termination 176 and converges to a point at the rounded surface of the stem, as at 178.

As indicated in the arrangement of FIGURE 1, when the point 178 is positioned above the upper end of sleeve 170, liquid flow proceeds from the chamber 166. Stem 168 is adjusted lengthwise by turning same in its nut 150.

Chamber 166 communicates with a liquid outlet tube 180 that is mounted in body 130 and that includes a reduced portion 182 that extends outwardly of the body through the gas outlet chamber 138.

The nozzle component 20 that is shown applied to regulating component 18 in the illustrated embodiment is associated with the gas outlet chamber 138 in the manner that is diagrammatically shown in FIGURES 1 and 5. The specific nozzle component illustrated comprises an inner tubular member 190 received within an outer tubular member 192. The inner tubular member 190 is formed with longitudinally extending ribs 194 and includes a central longitudinally extending passage 196 that forms the liquid passageway for this component of the invention. The spaces between ribs 194 and the inner surfaces of member 192 form a plurality of passageways 198 that as a whole provide the gas passageway for the component 20. The member 190 is preferably formed from oil resisting plastic or rubberlike material and may conveniently be extruded to the shape desired. The member 192 in the illustrated nozzle component embodiment may be formed from a flexible metallic or plastic substance of appropriate characteristics. Preferably, both the members 190 and 192 are flexible.

A nozzle tip 200 is mounted on the downstream end of the members 190 and 192. Nozzle tip 200 includes a cylindrical portion 202 counterbored as at 204 to receive the downstream end of member 192. Member 190 extends outwardly of member 192 to the point that its downstream end abuts the conical portion 206 of the nozzle tip 200. Nozzle tip 200 at its end is formed with an orifice 208 through which the liquid and gas pass in emitting from the nozzle component. A short tubular insert 210 received in the end of member 190 extends the liquid passageway of the nozzle component to a point just short of the end of the nozzle tip.

At the upstream end of the nozzle component, the inner member 190 extends outwardly of the outer member 192 and is received over the reduced portion of member 180. The member 192 carries a screw threaded coupling nut 212 which is screw threadedly received in appropriate recess 214 formed in the metering component body 130, and bears against flange 215 carried by member 192.

When the mist coolant apparatus of which components 18 and 20 form a part is operated, gas and air from a suitable source of supply pass through the respective separate gas and liquid passageways of these components to the end of the nozzle tip and there are mixed to form a mistlike spray which is directed to the point where cooling and/or lubrication is desired, that is, the point of application.

The different components described may be secured in appropriately spaced positions with respect to the work, the flow regulating component 18 being mounted sufficiently near the point of application so that the nozzle component may be flexed and positioned as required to accomplish the cooling and/or lubricating function desired. The component 18 may be appropriately formed for attachment to fixed brackets or other supports as desired.

FIGURES 7 and 8 illustrate a modified form of liquid flow regulating valve which includes substantially the same elements as those illustrated in FIGURES 1 and 4, but wherein the modified stem 168a is formed with a tapering ridge 220 that is pressed into the internal surface of the sleeve 170 to form two channels 222 proportioned somewhat as shown in FIGURE 8. The ridge 220 tapers from a point 224 that is aligned with the cylindrical surface of stem 168a to its full size at a point 226. The channels 222 are opened and closed by moving the stem 168a longitudinally so as to move the ridge 220 into and out of engagement with the sleeve 170.

The specific flow regulating component 18 that is illustrated is utilized in a mist coolant system by connecting gas passageway 134 to a suitable source of gas, such as air under pressure, connecting insert 88 to a source of liquid under pressure, which liquid in this instance should be appropriate for mist coolant purposes, such as a suitable water solvent compound, and opening up the liquid flow control valve of component 18 until a steady flow of liquid passes from the nozzle component orifice.

After a steady flow is obtained from the nozzle component, the desired mist may be obtained by adjusting the flow regulating component that control the respective nozzle component. The liquid regulating valve illustrated in FIGURES 1, 4, and 5 is of particular significance in that it permits liquid flow to be regulated from rates as low as one drop every fifteen seconds to a rate as high as one pint per hour and yet provides an uninterrupted flow. The actual gas pressure needed in mist coolant systems to force out the liquid depends upon the mist desired, but in general, in the low volume flow ranges, pressure should be as low as possible. I have found that the illustrated component 18 will function with as little as one pound per square inch of air pressure in the system in which it is incorporated.

It may be added that the term mist as applied to the jet or spray that is provided by the nozzle component, for the purposes of this description, is intended to mean a jet of the type in which the liquid droplets are highly dispersed, but are not suspended in the air, as they would be in a fog, but move perceptibly downward.

I have found that the liquid flow regulating valves of FIGURES 15 and 17–21 are not confined in use to low pressure flow regulation, and, moreover, may be employed to regulate the flow of gases. Thus, these valves are fluid flow control valves in and of themselves.

This application is a continuation-in-part of my said abandoned application Serial No. 543,484, filed October 28, 1955.

The foregoing description and the drawing are given merely to explain and illustrate my invention and the manner in which it may be performed, and the invention is not to be limited thereto except in so far as the appended claims are so limited, since those skilled in the art who have my disclosure before them will be able to make modifications and variations therein without departing from the scope of the invention.

I claim:

1. A fluid flow control valve for providing a continuous low volume flow of fluid at relatively low pressures comprising a fluid conduit forming a passage for the fluid, a resilient sleeve encompassing the passage within the conduit and having an elongated cylindrical bore, a longitudinally movable cylindrical stem having an elongated end portion received in said sleeve and resiliently engaged thereby, said sleeve and stem portions being complementally proportioned to seal off fluid flow through the passage solely by resilient gripping engagement of said stem portion by said sleeve bore throughout engaged cylindrical areas of substantial length, said sleeve and stem having portions of their engaged surfaces formed to define a longitudinally extending feed channel of limited length and longitudinally varying cross section, and means for moving the stem longitudinally of the sleeve to close the channel and thereby seal off fluid flow through said passage or to open a portion of the channel and thereby estabish communication between the upstream and downstream sides of said sleeve.

2. The valve set forth in claim 1 wherein said stem is formed with a longitudinally tapering ridge forming said channel when the same is pressed into said sleeve.

3. The valve set forth in claim 1 wherein said end portion of the stem is formed with a groove that extends from the adjacent end thereof and converges to a termination downstream of said end at the rounded surface of the stem.

4. A liquid flow control valve for providing a continuous low volume liquid flow comprising a fluid conduit forming a passage for the liquid, a resilient tubular member encompassing the passage within the conduit and having an elongated cylindrical bore portion, a longitudinally movable stem having an elongated cylindrical end portion received in the bore portion of said tubular member, said tubular member portion being proportioned to resiliently grip said stem end portion when said stem end portion is received in said member, said stem end portion being formed with a groove that extends generally longitudinally of said stem for a limited length, and means for moving said stem longitudinally of the central axis of said tubular member to dispose said stem end portion within said tubular member to cover the entire groove and thereby seal off fluid flow through said passage or uncover a portion of said groove and thereby establish communication between the upstream and downstream sides of said tubular member.

5. The valve set forth in claim 4 wherein said groove converges to a termination at one end of said groove at the surface of said stem end portion that is engaged by said tubular member.

References Cited in the file of this patent

UNITED STATES PATENTS

| | | |
|---|---|---|
| 201,196 | Philips | Mar. 12, 1878 |
| 1,914,245 | Echola | June 13, 1933 |
| 2,672,883 | Dillman | Mar. 23, 1954 |
| 2,713,989 | Bryant | July 26, 1955 |
| 2,717,112 | Ralston | Sept. 6, 1955 |
| 2,731,231 | Garrott | Jan. 17, 1956 |
| 2,753,927 | Garraway | July 10, 1956 |
| 2,850,323 | Veres | Sept. 2, 1958 |
| 2,868,584 | Faust | Jan. 13, 1959 |
| 2,899,980 | Loebel | Aug. 18, 1959 |